Jan. 19, 1937.                R. ERICH                 2,068,315
              AUTOMATIC SIGNAL ACTUATING SWITCH FOR VEHICLES
                          Filed April 29, 1933
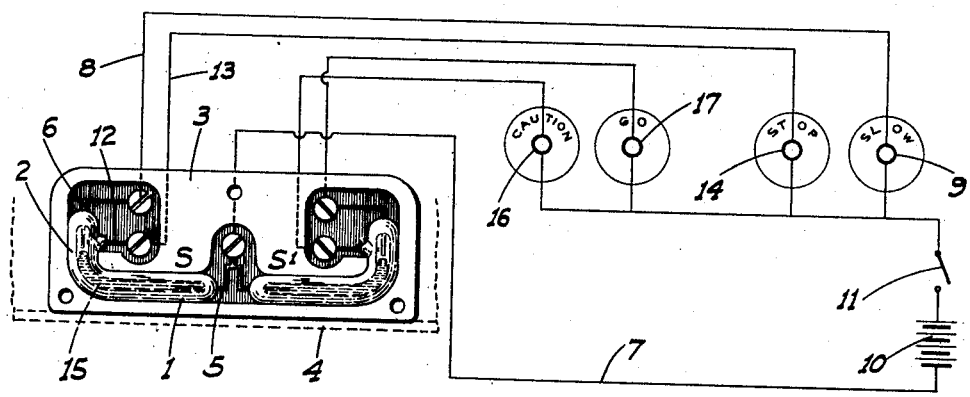
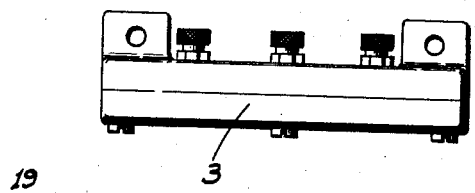
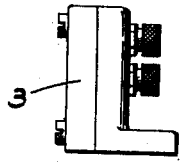
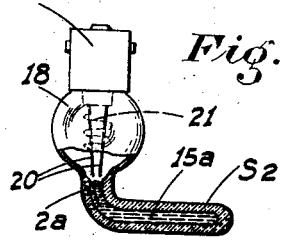
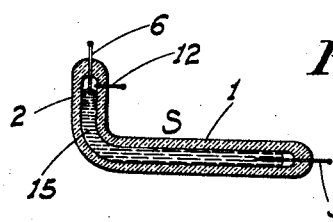
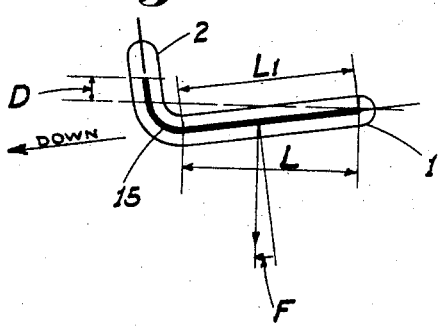
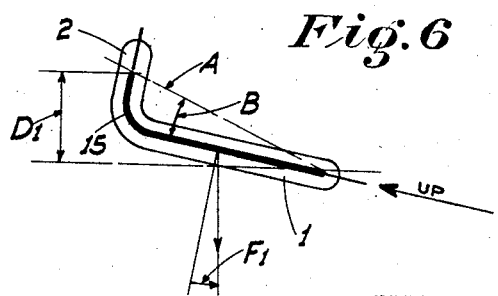
INVENTOR
Reuben Erich
BY
ATTORNEY Patented Jan. 19, 1937

2,068,315

UNITED STATES PATENT OFFICE 2,068,315

AUTOMATIC SIGNAL ACTUATING SWITCH FOR VEHICLES

Reuben Erich, Avenal, Calif., assignor of one-third to William J. Erich and one-third to Walter G. Erich, both of San Joaquin County, Calif.

Application April 29, 1933, Serial No. 668,529

2 Claims. (Cl. 200—52)

This invention relates to signal devices especially adapted for use on motor vehicles to indicate to the driver of a vehicle behind the one on which the signal is mounted of various phases of movement of such vehicle.

The present invention also particularly represents improvements over the structure shown in my co-pending application, Serial No. 639,560, filed October 26, 1932, of which this application is a continuation in part. The end to be attained is the provision of a switch for the purpose indicated so constructed as to be automatically responsive to changes in speed or velocity of the vehicle, so that corresponding signals will be given automatically and without any attention on the part of the driver.

The principal object of this invention is to construct an automatic switch operating on the principle of Newton's laws of motion rather than depending on the action or laws of gravity, which as a matter of fact is negatived as much as possible. The switch comprises essentially a tube or other container rigidly fixed on the vehicle and having a circuit closing liquid sealed in a vacuum or inert gas therein which, when the tube is at rest or moving at a uniform speed remains stationary in the tube, under which conditions the switch is held open. Under the influence of a retarding or accelerating force applied to the vehicle and consequently to the tube fixed thereon the liquid in the tube is displaced or moves in the tube due to the relative change of velocity and the switch is closed until a condition of rest or uniform velocity is restored. In other words, the switch is operated by changes of velocity of the vehicle.

Another object is to provide a switch of this character so arranged that a number of different signals may be successively given by a single switch according to the rate at which the retarding or accelerating movement takes place. In other words, a relatively gradual slacking or increase of speed causes one signal to be given while a sudden or rapid change of motion causes another signal to be given.

Still another object is to construct the switch so that the vehicle may ascend or descend grades up to a predetermined limit without the liquid in the tube being acted on by gravity to the extent necessary to cause it to move or be displaced, so that the signal circuit will not be undesirably closed under such conditions.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a side view of a switch structure as mounted on a motor vehicle, and shown in diagrammatic connection with a signal light installation, to indicate changes of velocity either of a retarding or an accelerating nature, the switch structure being shown as actually made and used.

Fig. 2 is a top plan view of the switch casing.

Fig. 3 is an end view of the same.

Fig. 4 is a sectional elevation of the decelerating switch detached as functioning to close a signal circuit.

Fig. 5 is a diagram of said switch as disposed when the vehicle is traveling on a down grade.

Fig. 6 is a similar view showing the position of the switch when the vehicle is traveling on an up grade.

Fig. 7 is a sectional elevation of a combination switch and light unit.

Referring now more particularly to the characters of reference on the drawing and particularly at present to Figs. 1 to 6, the decelerating switch S comprises a container of suitable character, preferably a tube closed at both ends and which for convenience of manufacture and ease of installation is preferably made of glass though other materials may obviously be used. This tube has a normally horizontal leg 1 extending lengthwise of the vehicle, or parallel to the ground, and an upstanding leg 2 at its forward end. The tube is rigidly mounted against movement on the vehicle in any suitable manner such as by enclosing the same in a suitable casing 3 which is secured to the frame 4 of the vehicle.

An electrode 5 projects into the rear end of the horizontal leg 1 some distance, while another electrode 6 projects into the upper end of the leg 2 and terminates some distance from its upper end. The electrodes are connected by wires 7 and 8 respectively with the terminals of a signal lamp 9 indicating "Slow down" and mounted so as to be visible from the rear of the vehicle. The wire 7 has a source of electric current such as a battery 10 therein as well as a hand switch 11; this battery and switch being preferably the storage battery and ignition switch respectively of the vehicle.

Another electrode 12 also projects into the leg 2 and terminates above the termination of the electrode 6. Said electrode 12 is connected by a wire 13 with one terminal of a stop light 14 which is preferably positioned adjacent the light 9 and whose other terminal is connected to the wire 7, so that the electrode 5 is common to both signals. A quantity of electric-current conducting liquid 15 such as mercury is sealed in vacuum in the tube. The volume of the liquid is less than the cubic capacity of the tube so that while the liquid normally completely fills the horizontal leg it only extends part way up the leg 2 or so as to terminate short of the electrode 6 as shown. By reason of this construction it will be evident that as long as the vehicle is at rest or traveling at a uniform velocity, there will be no relative movement between the tube and liquid and the latter will remain spaced from the electrode switch and the signal circuit will of course be held open. When however the velocity of the vehicle is decreased as by removing the foot from the throttle pedal and allowing the velocity of the vehicle to be gradually decelerated while traveling under its own momentum, the liquid tending to remain moving at said uniform velocity moves forwardly in the tube and consequently rises in the leg 2 sufficient to engage the electrode switch.

This closes the circuit to the signal line since the electrode 5 is of sufficient length to maintain contact with the liquid regardless of the forward displacement of the latter, as shown in Fig. 2.

The signal will remain in operation with the deceleration of the car for a certain length of time depending on various conditions and until the liquid, by the action of gravity and the removal of the restraining negative accelerating force as a result of the vehicle coming to rest or attaining a uniform velocity, is restored to its original position in the tube breaking the signal circuit. If a relatively sudden deceleration movement of the car takes place, as when the brakes are applied, a greater forward movement of the liquid takes place or sufficiently to raise it in the tube so as to engage the higher stop circuit electrode 12 as well as the electrode 6.

In designing a switch for motor vehicle service, grades which the vehicle may negotiate and which will cause the horizontal leg of the tube to be positioned on similar slopes, must be taken into consideration. In other words, the normal height of the liquid in the vertical leg 2 must be such as will enable the horizontal leg to assume a considerable downward and forward slope without the action of gravity, independent of that of a change of inertia or velocity, causing the raising of the liquid in the vertical tube such as would close the signal circuit regardless of the velocity of the car.

I have chosen a grade of approximately 13% (which may however be varied) as representing the maximum grade ordinarily encountered, and I have therefore designed the tube and calculated the amount of liquid to be placed therein so that a line A drawn through the top of the liquid in the vertical leg and the top of the liquid at the opposite end of the horizontal leg includes an angle B with the horizontal leg such that the line A represents the mentioned grade. In other words, the angle B may be called the critical angle and as long as the car is not descending a grade steeper than 13%, or as long as the line A is not disposed at a downward and forward slope relative to a horizontal plane, the action of gravity on the liquid in the horizontal leg is counteracted by the downward action on the liquid in the vertical leg and no rise of the liquid in the latter will take place. If the grade negotiated by the vehicle is greater than that determined by said critical angle, the liquid will rise of itself in the vertical leg as will be evident and will close the "Slow down" signal circuit regardless of the velocity of the vehicle. This however is not disadvantageous and is actually a safety measure, since such a grade may be considered dangerous and it is just as well that a vehicle behind should be given timely warning.

Sharp vertical curves may also be included in the term "grade", and the switch will function efficiently when the vehicle is taking such curves at high speed.

The diagram Figs. 5 and 6 illustrate the inertia or velocity controlled operation of the switch when the vehicle is descending a grade less than the critical grade, and also when the vehicle is ascending a grade of any magnitude, since in the latter case the critical grade or angle is of no particular moment. When the vehicle and the horizontal leg of the tube are disposed with a downward and forward slope, as in Fig. 5, the difference in height D of the mercury between the opposite ends of the column in the tube is obviously less than normal. Also the effective length L of the column of mercury in the horizontal leg is less than the actual length $L^1$. Hence such column is less able to lift the vertical column of mercury but the lifting tendency is still too great since the distance D is of course much shorter than normal. Offsetting this tendency we have however the gravity component force F which decreases the effectiveness of the mercury column in the leg 1. A compensating action or effect is therefore provided so that a gradual deceleration of the sudden braking action on the vehicle (and which is relatively difficult to effect on a down grade) will cause the switch to function as efficiently as when traveling on a level.

When the vehicle is ascending a grade, as shown in Fig. 6, the difference in level between the ends of the mercury and indicated by $D^1$ is greater than normal. In this case however the gravity component force $F^1$ aids in naturally increasing the effectiveness of the mercury column in the leg 1, so that here again the relatively easy decelerating or braking action applied to the vehicle, and which is all that is necessary to slow or stop a vehicle on an up grade, will cause the switch to function.

The accelerating switch $S^1$ actuates the "Caution" and "Go" signals 16 and 17 corresponding to the slow and stop signals. The construction of this switch is identical with that above described, and it is also mounted in the casing 3. This switch operates in the reverse relation, or with an accelerating instead of a decelerating movement of the car. The switch tube $S^1$ is therefore set in the casing with the vertical leg to the rear as shown in Fig. 1, or in opposed relation to the switch S.

I may also mount switches of similar character to actuate right and left direction signals, such switches being arranged to be actuated by lateral deviations of the car to one side or the other from a straight line of travel.

In Fig. 7, the upper leg 2a of the switch tube 3² is directly connected to the bottom of a lamp bulb 18 and communicates therewith. This bulb is provided with a base 19 adapted to fit into a socket as usual, so that the switch tube, which is rigid with the bulb, is supported in common with the supporting of the bulb. Spaced circuit electrodes 20, one of which is connected to the filament 21, project downwardly for engagement with the mercury 12a in the tube when the latter rises in said vertical leg, thus closing the circuit, and causing the bulb to be illuminated. This unit is of course intended to be mounted at the back of a vehicle where the bulb illumination will be visible from the rear. Instead of the filament, the bulb may have neon gas or the like therein, to provide similar illumination when the electrodes are engaged.

While I have above shown and described this switch as being particularly mounted in connection with a motor vehicle, it will be evident that its use is not confined to such service but may be employed in any case where the closing or opening of a circuit by a change of velocity can be advantageously used. Such use for instance may be in connection with airplanes, elevators, and other vehicles having a more or less directly vertical movement.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. An inertia switch including an L shaped tube comprising a normally horizontal leg and an upstanding leg formed on one end of the horizontal leg, the opposite end of the latter being closed, an electrode projecting into the horizontal leg adjacent said closed end, liquid in the tube normally completely filling the horizontal leg and extending a certain distance up the upstanding leg, and another electrode projecting into said upstanding leg a predetermined distance above the normal level of the liquid therein; the liquid normally extending upwardly into the upstanding leg to a height sufficient to enable the horizontal leg of the tube to be tilted to lie at a predetermined downward angle from its closed end without the point in the upstanding leg, to which the liquid normally rises, being moved below the horizontal plane of the closed end of the horizontal leg.

2. An inertia switch including an L shaped tube comprising a normally horizontal leg and an upstanding leg formed on one end of the horizontal leg, the opposite end of the latter being closed, an electrode projecting into the horizontal leg adjacent said closed end, liquid in the tube normally completely filling the horizontal leg and extending a certain distance up the upstanding leg, and vertically spaced electrodes in the upstanding leg, the lower one of which is above the normal level of the liquid in said leg whereby the electrodes will be successively contacted by the liquid with increasing extents of rise thereof in said upstanding leg.

REUBEN ERICH.